No. 847,426. PATENTED MAR. 19, 1907.
J. MOLL.
MACHINE FOR TREATING CYLINDRICAL MACHINE PARTS.
APPLICATION FILED JULY 12, 1906.
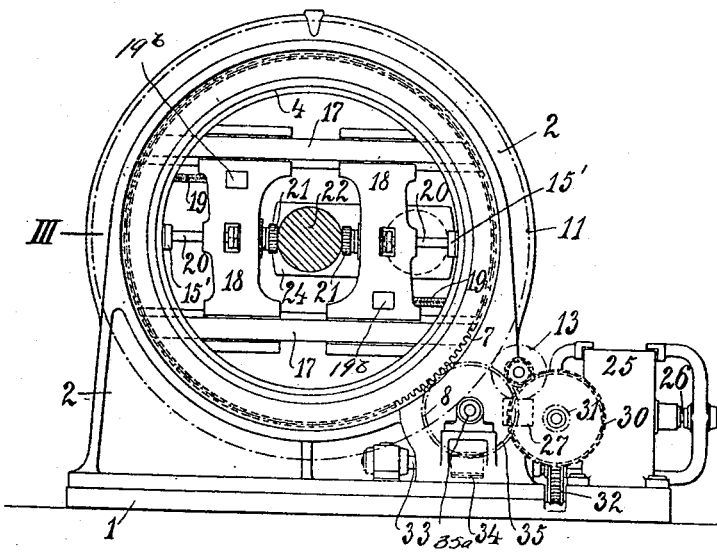
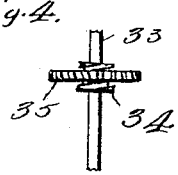
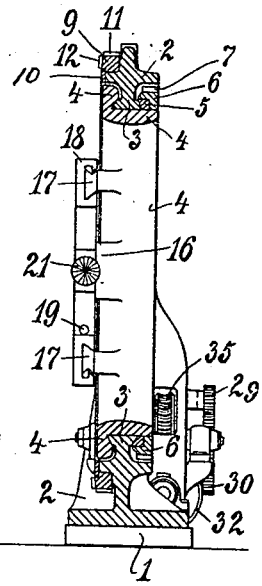
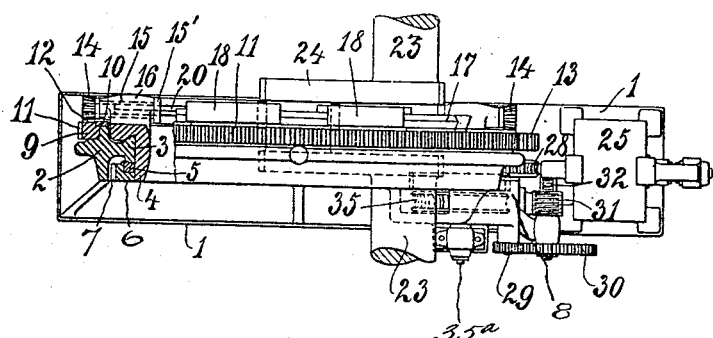
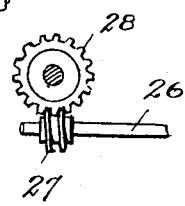
Witnesses:
L. Waldman
C. Heymann.
Inventor:
Johann Moll
by B. Singer
atty.

UNITED STATES PATENT OFFICE.

JOHANN MOLL, OF AUGSBURG, GERMANY.

MACHINE FOR TREATING CYLINDRICAL MACHINE PARTS.

No. 847,426.  Specification of Letters Patent.  Patented March 19, 1907.

Application filed July 12, 1906. Serial No. 325,982.

*To all whom it may concern:*

Be it known that I, JOHANN MOLL, a subject of the German Emperor, residing at Augsburg, in the Kingdom of Bavaria and Empire of Germany, have invented certain new and useful Improvements in Machines for Treating Cylindrical Machine Parts, of which the following is a specification.

The present invention relates to a machine enabling to treat a cylindrical machine part from beginning to end—that is to say, rendering it possible to finish the work in said apparatus without removing it therefrom during the whole operation—for instance, in the case of the coupling-rod pins in locomotive-wheels or the cylindrical part of a fly-wheel shaft.

Formerly it was necessary to treat the work in several machine-tools for the same purpose. For instance, the cylindrical part first had to be turned cylindrical in a lathe or cut cylindrical in a milling-machine, then a grinding-machine had to be applied for the purpose of treating said part more accurately than would be possible by means of turning or cutting, and, furthermore, when holes were to be drilled in said part or slots were to be cut for the key a boring-machine or a grooving-machine was necessary for effecting these operations. Now, every time the work was removed from one machine—for instance, from the grinding-machine—to the next one—for instance, the grooving-machine—then small inaccuracies arose, for it is a well-known fact that it is impossible to fix a machine part so accurately on a machine-tool that its treatment can be continued on the next machine at the place where the previous machine stopped working without any inaccuracy. Besides this, the former operation has the drawback that a loss of time ensues when the machine part has to be removed from one machine-tool and fixed in another one, and further expenses arise in consequence of the fact that every time the machine part is passed on from one machine-tool to the other another attendant has to occupy himself with the matter, being forced to examine and measure again and ask what he is to do. Consequently a certain amount of time is lost for which the workman has to be paid solely for the purpose of his information. Now, the present machine, as stated above, is constructed in such a manner as to enable to finish the work from beginning to end.

In the annexed drawing one embodiment of my invention is illustrated.

Figure 1 is a side view thereof; Fig. 2, a vertical section seen from the left; Fig. 3, a top view, the left part thereof representing a section on line 111 of Fig. 1. Fig. 4 is a detail view of shaft 33, worm 34, and wheel 35; and Fig. 5 is a detail view of shaft 26, worm 27, and wheel 28.

Fixed to the bed-plate 1 in the well-known manner is the machine-frame 2. The greater part of this frame 2 has the form of a large circular bearing, the inner border 3 thereof being of dovetailed section and serving as a guide for the large turning ring 4. Attached to the latter are two rings 5 and 6, the former, 5, contacting the dovetailed border by the side and the latter, 6, being arranged beside the first one 5. At its exterior border the ring 6 carries teeth 7, adapted to be engaged by the pinion 8, which latter is driven by means of a motor.

Journaled in the frame 2 is a ring 9, which is retained in its position upon the frame 2 by means of a suitably-disposed ring 10. (Illustrated in Figs. 2 and 3.) The ring 9 is provided on its exterior border with teeth 11 and on its exterior side with bevel-teeth 12, the teeth 11 being engaged by the teeth of a pinion 13, driven by a motor, thus rotating the ring 9. Fixed to shafts 15 are two bevel-wheels 14, meshing with the gear 12. These shafts 15 are hollow and journaled in the bearings 16, rings 15', respectively, being attached to their inner end, so as to prevent the hollow shafts 15 from removal from the bearings 16.

To the turning ring 4 are secured two parallel bars 17, serving for the purpose of guiding the two slides 18 to and fro, such movement being brought about by means of nuts 19$^a$, rotatably mounted in said slides and engaging the stationary screw-spindles 19. Journaled in the two slides 18 are the shafts 20, carrying a tool—for instance, a cutter 21—at their inner ends. The exterior end of each of these shafts 20 is arranged in the hollow shafts 15 of the bevel-wheels 14 and coupled with it in such a manner as to enable a longitudinal removal of the hollow shafts, and thereby prevent its rotation. Consequently if the bevel-wheels 14 are rotated on account of the motion of the ring 9 the cutters 21 also must rotate, and the latter may be moved radially in regard to the cylindrical work—to wit, inward or outward—by turning the nuts 19ª in the proper direction to the proper degree upon screw-spindles 19.

As shown in the drawing, the crank-pin 22 of a fly-wheel shaft 23 is to be worked, and the shaft 23, the cranks 24, and the pin 22 represent one piece. For the purpose of working this pin 22 precisely cylindrical by means of the present machine the machine-frame 1 2 is screwed to the bed of a lathe and the work 23 24 22 fixed to the slide-rest of said lathe. Now, while the machine-frame 1 2 remains immovable the slide-rest, with the work, may be moved to and fro in the longitudinal direction of the shaft 23 by means of the guide-spindle.

The machine is moved by means of an electromotor 25, a worm 27 being keyed to shaft 26, Fig. 1, and engaged by the worm-wheel 28, Fig. 3. Fixed to the same shaft as the latter is both the spur-wheel 13, above referred to, and the small pinion 29.

As explained above, the spur-wheel 13 meshes with the teeth of the large ring 9 for the purpose of driving the rotatable tools 21. The pinion 29 engages the spur-wheel 30, and the latter is keyed to the same shaft as the worm 31. This worm 31 meshes with the worm-wheel 32, and the latter is fixed to the same shaft 33 as the worm 34, which engages the worm-wheel 35. The worm-wheel 35 is mounted on a shaft 35ª, the pinion 8 being fixed upon this shaft and consequently driven from said worm-wheel. As above intimated, the pinion 8 engages the teeth 7 of the ring 6 and through the latter transmits its motion to the turning wheel 4, upon which said ring 6 is mounted.

As the motion of the rapidly-rotating motor-shaft 26 is transmitted, by means of the three worms 27, 31, and 34, to the ring 4, it will be obvious that the latter moves very slow, this being necessary, because the tools 21, all the same if it is a cutter, emery-wheel, or the like, must progress very slow on the surface of the work 22. However, the transmission of motion from the motor-shaft 26 to the tools is much quicker, as only one intermediate shaft is arranged for bringing about said transmission, to which shaft the worm-wheel 28 and the spur-wheel 13 are fixed. The latter meshes with the teeth of the ring 9, and said teeth 12 move the bevel-wheels 14, the hollow shafts 15 of which are coupled to the shafts 20 of the tools 21, adapted to be moved longitudinally.

The operation of the machine is as follows: When the frame 1 2 and the work 23 24 22 are fixed to the bed of the lathe, as explained above, and the cutters 21 are adjusted as required by turning the nuts 19ª upon the screw-spindles 19, the electromotor 25 is inserted and the cutters 21 operated on the work till the ring has moved slowly once around the work 22. Then the latter, fixed to the slide-rest of the lathe, is moved on a small distance by means of the guide-spindle, (not shown in the drawing,) and the ring 4, with the cutters 21, is rotated once again. This following up of the work 22 is continued every time after a further rotation of the ring 4 till the pin 22 is cut over all its length. Then the slides 18 are screwed back outwardly by means of the spindles 19, so that the cutters 21 do not touch the work 22 any more. The cutters 21 are removed from the shafts 20 and replaced by finer tools—for instance, emery-wheels. After this the slides 18 are moved up to the work again by means of the screw-spindles 19 till the emery-wheels touch said work, and now the operation above explained is repeated.

Having now fully described my invention, I declare that what I claim is—

A machine of the class described comprising an annular bearing, a ring rotatably inclosed thereby, a second ring surrounding said bearing and rotatable thereon, a slide-block adjustably mounted in said first-named ring, a shaft journaled in said slide-block and carrying at its free end a tool, said shaft having at its outer end slidable connection with a hollow shaft, but being rotatable therewith, said hollow shaft carrying at its free end a bevel-gear, said last-named ring being formed on one side thereof with beveled gear-teeth designed to intermesh with said bevel-gear, a motor, a train of gearing between said motor and said first-named ring and a train of gearing between said motor and said last-named ring, said last-named ring being adapted for rotation by its said gear-train at a greater speed than said first-named ring.

In testimony whereof I affix my signature in presence of two witnesses.

JOHANN MOLL.

Witnesses:
OTTO ZELLER,
KARL SCHÄDEL.